April 15, 1930.     A. B. DRÄGER     1,754,419
EYEPIECE FOR GAS PROTECTIVE MASKS
Filed April 22, 1926
Fig. 1.
Fig. 2.
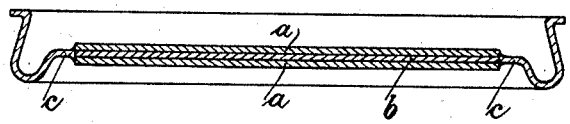
Fig. 3.
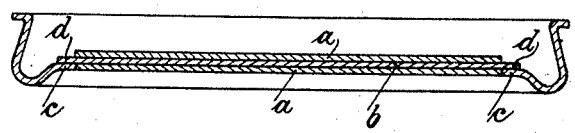
Fig. 4.
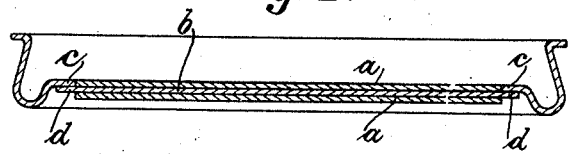
Fig. 5.
Fig. 6.
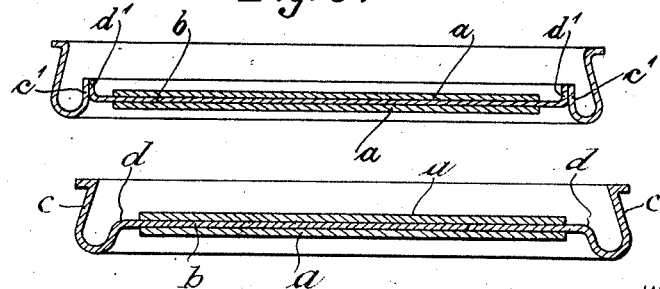
INVENTOR
ALEXANDE BERNHARD DRÄGER
BY
INVENTOR Patented Apr. 15, 1930

1,754,419

UNITED STATES PATENT OFFICE

ALEXANDER BERNHARD DRÄGER, OF LUBECK, GERMANY; ELFRIEDE DRÄGER, NÉE STANGE, EXECUTRIX OF SAID DRÄGER, DECEASED, ASSIGNOR TO HEINRICH OTTO DRÄGER, OF LUBECK, GERMANY

EYEPIECE FOR GAS-PROTECTIVE MASKS

Application filed April 22, 1926, Serial No. 103,678, and in Germany June 10, 1925.

The present invention relates to eye-pieces for gas-protective masks, and the object is to produce an eye-piece which is reliable in all respects.

Trials have shown that eye-pieces for gas-protective masks made of a transparent workable material, such as cellon, celluloid or the like either separate from or integral with the frame or mounting attaching it to the mask, as well as eye-pieces made of a so-called triple-glass, that is to say of two glass disks with an intermediate disk of celluloid, have certain advantages. The former have the advantage that they are perfectly air- and gas-tight and are economically manufactured, but they have the disadvantage that after some use the surfaces, owing to the delicacy of the material, are easily damaged and suffer from the influence of moisture or chemicals such as sharp gases, and thus become dull and gradually lose their transparency, while the latter, though well adapted to withstand outer influences, have the disadvantage that the triple-glass cannot be given any other but a flat shape, and therefore under ordinary circumstances necessitate a mounting of metal or a metal frame for fastening the eye-piece to the mask and such frame or mounting increases the costs of manufacture and the liability of the mask becoming leaky.

By the eye-piece forming the subject matter of the present invention the drawbacks stated above are avoided and the good properties individually present in the two eye-pieces explained above are, in my new construction presented in combination.

With this object in view the eye-piece according to the invention comprises, like the triple-glass referred to, two glass-disks and an intermediate disk of celluloid, cellon or similar material, which however is given such dimensions that it projects outwardly all round the periphery thus forming a rim of such material to which a frame or mounting of similar material may conveniently be attached, either by cementing or otherwise to form a gas-tight joint.

In the following the invention will be more fully described with reference to the accompanying drawing in which Fig. 1 is a section of an eye-piece proper constructed according to the invention.

Figs. 2 to 6 are sections of an eye-piece showing various modes of attaching a mounting to the eye-piece proper to form an eye-piece that may be readily connected with a mask.

In the construction shown in Fig. 1 the eye-piece consists of the two thin glass-plates $a$ between which an intermediate disk $b$ of workable transparent non-vitreous material, such as celluloid, cellon or the like is cemented in well known manner. The intermediate disk $b$ may be of the same or of larger diameter or size than the disks $a$ thus having a bare edge $d$ projecting outwardly all round the disks $a$ on account of which it is well adapted to be connected to a frame or mounting $c$ of same or similar non-vitreous material as the disk $b$.

In the construction shown in Figure 2 the intermediate disk $b$ is of the same diameter or size as the glass disk or plates $a$. The edge of the disk $b$ is thus adapted to be joined with or cemented to a frame or mounting $c$ of similar material.

In the construction shown in Figure 3 the frame $c$ is connected to the disk $b$ by cementing it to the outer flat surface of the projecting rim $d$ which constitutes an annular flange, the outer face of the frame being flush or approximately flush with the outer face of the outer glass disk $a$.

In the construction shown in Fig. 4 the frame $c$ is cemented to the inner surface of the projecting rim or annular flange $d$ of the disk $b$.

The projecting rim $d$ of the disk $b$ may if desired be given an upturned edge to provide an annular flange $d'$ and the frame $c$ may have a similar cylindrical flange $c'$, snugly fitting to the flange $d'$, so as to form a cylindrical joint, which may be cemented with great facility, as shown in Fig. 5.

The rim $d$ may even be of such size, that it itself may be shaped to form the mounting or frame $c$, which in this construction is therefore integral with the disk $b$, as shown in Fig. 6.

It will be obvious that by first uniting the glass disks or plates *a* to the non-vitreous disk such as *d*, while the latter is in a flat condition and entirely dissociated from the cementing operation including the holding of the associated parts under pressure until the cementing material has properly hardened, this operation can not only be easily but more effectively performed than it would be if the non-vitreous material were in part bent or already attached to a mounting of bent cross-section like the one shown in the drawings.

I claim:

In an eye-piece for gas protection masks in which a lens is secured to a mounting of non-vitreous material, the combination of two outer disks of glass and an intermediate disk of non-vitreous material secured between said glass disks and projecting beyond the peripheries thereof to form an exposed annular flange, said disks being in surface engagement, the mounting of non-vitreous material being fixed in surface engagement with said annular flange to form a gas tight fit between the mounting and the intermediate disk of non-vitreous material.

In testimony thereof I have signed my name to this specification.

ALEXANDER BERNHARD DRÄGER.